(12) United States Patent
Fujisaki et al.

(10) Patent No.: US 12,478,327 B2
(45) Date of Patent: Nov. 25, 2025

(54) MEDICAL SENSOR, REUSABLE PORTION OF MEDICAL SENSOR, AND DISPOSABLE PORTION OF MEDICAL SENSOR

(71) Applicant: NIHON KOHDEN CORPORATION, Tokyo (JP)

(72) Inventors: Hideki Fujisaki, Tokorozawa (JP); Kazumasa Ito, Tokorozawa (JP); Yoshinori Ueda, Tokorozawa (JP)

(73) Assignee: NIHON KOHDEN CORPORATION, Tokyo (JP)

( * ) Notice: Subject to any disclaimer, the term of this patent is extended or adjusted under 35 U.S.C. 154(b) by 1107 days.

(21) Appl. No.: 17/438,210

(22) PCT Filed: Mar. 16, 2020

(86) PCT No.: PCT/JP2020/011483
§ 371 (c)(1),
(2) Date: Sep. 10, 2021

(87) PCT Pub. No.: WO2020/189628
PCT Pub. Date: Sep. 24, 2020

(65) Prior Publication Data
US 2022/0175318 A1 Jun. 9, 2022

(30) Foreign Application Priority Data
Mar. 18, 2019 (JP) .................... 2019-049555

(51) Int. Cl.
*A61B 5/00* (2006.01)
*A61B 5/1455* (2006.01)
(Continued)

(52) U.S. Cl.
CPC ........ *A61B 5/6838* (2013.01); *A61B 5/14552* (2013.01); *A61B 5/6826* (2013.01);
(Continued)

(58) Field of Classification Search
CPC . A61B 5/6838; A61B 5/14552; A61B 5/6826; A61B 2560/0285;
(Continued)

(56) References Cited

U.S. PATENT DOCUMENTS 5,758,644 A 6/1998 Diab et al.
5,823,950 A 10/1998 Diab et al.
(Continued)

FOREIGN PATENT DOCUMENTS

JP 2006-122693 A 5/2006

OTHER PUBLICATIONS

Communication issued Oct. 18, 2022 by the Japanese Patent Office in Japanese Patent Application No. 2019-049555.
(Continued)

*Primary Examiner* — Justin Xu
(74) *Attorney, Agent, or Firm* — Sughrue Mion, PLLC (57) ABSTRACT

A reusable portion includes a first connector and a light emitter. A disposable portion includes a support, a second connector and a light detector. The support has a translucent portion and adapted to be attached on a body of a subject. The second connector is supported by the support and configured to couple with the first connector. The light detector is supported by the support and configured to output a signal corresponding to an amount of light incident on the light detector. Under a condition that the first connector and the second connector are coupled, the light emitter is disposed so as to face the translucent portion, so that the first connector is enabled to detect the signal via the second connector.

14 Claims, 5 Drawing Sheets

(51) Int. Cl.
*H01R 13/52* (2006.01)
*H01R 13/58* (2006.01)

(52) U.S. Cl.
CPC ..... *H01R 13/5224* (2013.01); *H01R 13/5804* (2013.01); *A61B 2560/0285* (2013.01); *A61B 2562/146* (2013.01); *A61B 2562/227* (2013.01); *A61B 2562/228* (2013.01); *H01R 2201/12* (2013.01)

(58) Field of Classification Search
CPC ........ A61B 2562/146; A61B 2562/227; A61B 2562/228; H01R 13/5224; H01R 13/5804; H01R 2201/12
See application file for complete search history.

(56) References Cited

U.S. PATENT DOCUMENTS

| | | |
|---|---|---|
| 6,011,986 A | 1/2000 | Diab et al. |
| 2001/0020123 A1 | 9/2001 | Diab et al. |
| 2002/0062071 A1 | 5/2002 | Diab et al. |
| 2004/0147824 A1 | 7/2004 | Diab et al. |
| 2006/0189860 A1* | 8/2006 | Hacker ............. A61B 5/14553 600/323 |
| 2007/0112260 A1 | 5/2007 | Diab et al. |
| 2008/0171927 A1* | 7/2008 | Yang ................. A61B 5/14552 600/340 |
| 2009/0270703 A1 | 10/2009 | Diab et al. |
| 2012/0184832 A1 | 7/2012 | Diab et al. |
| 2014/0275883 A1* | 9/2014 | Haisley ............... A61B 5/6825 600/324 |
| 2014/0288400 A1 | 9/2014 | Diab et al. |

OTHER PUBLICATIONS

"OxiTip+ Sensor for Adults/Children"; package leaflet; revised 2nd edition; GE Yokogawa Medical Systems, Inc.; Oct. 1, 2004, (7 total pages).

International Search Report (PCT/ISA/210) dated Mar. 16, 2020 issued by the International Searching Authority in International Application No. PCT/JP2020/011483.

Written Opinion (PCT/ISA/237) dated Mar. 16, 2020 issued by the International Searching Authority in International Application No. PCT/JP2020/011483.

* cited by examiner

MEDICAL SENSOR, REUSABLE PORTION OF MEDICAL SENSOR, AND DISPOSABLE PORTION OF MEDICAL SENSOR

CROSS-REFERENCE TO RELATED APPLICATIONS

This application is a National Stage of International Application No. PCT/JP2020/011483 filed Mar. 16, 2020, claiming priority based on Japanese Patent Application No. 2019-049555, filed Mar. 18, 2019, the contents of all of which are incorporated herein by reference in their entirety.

FIELD

The presently disclosed subject matter relates to a medical sensor comprising a reusable portion and a disposable portion. As used herein, the term "reusable portion" means a portion of a medical sensor that can be reused at least once. As used herein, the term "disposable portion" means a portion of a medical sensor that is discarded after a single use.

BACKGROUND

NPL1 discloses a sensor adapted to be attached to a fingertip for calculating a transcutaneous arterial oxygen saturation (SpO2) of a subject as an example of such a medical sensor. The sensor comprises a light emitting element and a light detecting element. The light emitting element emits light toward a tissue of the fingertip of the subject. The light having passed through the tissue is detected by the light detecting element. The light detecting element outputs a signal corresponding to intensity of the detected light. The sensor comprises a disposable portion and a reusable portion. The disposable portion includes a support that adapted to be wrapped around the subject's fingertip. The support supports the light emitting element and the light detecting element. The reusable portion includes a connector and a cable. The connectors detect the signal outputted from the light detecting element and relay the signal to a device for calculating the SpO2 through the cable.

CITATION LIST

Non Patent Literature

[NPL1] "OxiTip+ Sensor for Adults/Children"; package leaflet; revised 2nd edition; GE Yokogawa Medical Systems, Inc.; Oct. 1, 2004

SUMMARY

Technical Problem

It is often helpful to enhance the convenience of the medical sensor comprising the reusable portion and the disposable portion.

Solution to Problem

A first aspect of the presently disclosed subject matter provides a medical sensor comprising:
a reusable portion comprising:
a light emitting portion configured to emit light; and
a first connector; and
a disposable portion comprising:
a support having a translucent portion and adapted to be attached to a body of a subject;
a light detecting portion supported by the support and configured to output a signal corresponding to an amount of incident light; and
a second connector supported by the support and configured to couple with the first connector,
wherein when the first connector and the second connector are coupled, the light emitting portion is disposed so as to face the translucent portion, so that the first connector is enabled to detect the signal via the second connector.

A second aspect of the presently disclosed subject matter provides a reusable portion of a medical sensor comprising:
a light emitting portion configured to emit light; and
a reusable connector,
wherein the reusable connector is configured to be coupled with a disposable connector that is a part of a disposable portion of the medical sensor;
wherein under a condition that the reusable connector and the disposable connector are coupled, the light emitting portion is disposed so as to face a translucent portion supported by a support that is a part of the disposable portion adapted to be attached to a body of a subject; and
wherein under the condition that the reusable connector and the disposable connector are coupled, the reusable connector is enabled to detect, via the disposable connector, a signal outputted from a light detecting portion of the disposable portion in accordance with an amount of light incident on the light detecting portion.

A third aspect of the presently disclosed subject matter provides a disposable portion of a medical sensor comprising:
a support having a translucent portion and adapted to be attached to a body of a subject;
a light detecting portion supported by the support and configured to output a signal corresponding to an amount of incident light; and
a disposable connector supported by the support and configured to couple with a reusable connector that is a part of a reusable portion of the medical sensor,
wherein under a condition that the reusable connector and the disposable connector are coupled, the translucent portion is disposed so as to face a light emitting portion that is a part of the reusable portion configured to emit light; and
wherein the disposable connector is configured to relay the signal to the reusable connector under the condition that the reusable connector and the disposable connector are coupled, the reusable connector.

According to the configuration of each aspect described above, the medical sensor can be divided into a reusable portion having a light emitting portion and a disposable portion having a light detecting portion. Since the light emitting element having a relatively high unit price can be reused, the running cost of the medical sensor can be reduced. This advantageous effect becomes more remarkable as the number of light emitting elements used by the medical sensor increases.

On the other hand, the light emitting portion is disposed so as to face the translucent portion only by coupling the first connector (reusable connector) and the second connector (disposable connector). Since the light detecting portion is fixed to the support in advance as a part of the disposable portion, the operation of positioning the light detecting portion on the support is omitted, so that the time until the medical sensor is made usable can be shortened.

Therefore, the convenience of the medical sensor comprising the reusable portion and the disposable portion can be enhanced.

DESCRIPTION OF EMBODIMENTS

Examples of embodiments will be described below in detail with reference to the accompanying drawings. The directional expressions "front," "rear," "top," and "bottom" appearing in the following descriptions are merely used for the convenience of explanation, and are not intended to limit the attitude of the illustrated structure in use.

Figure 1:
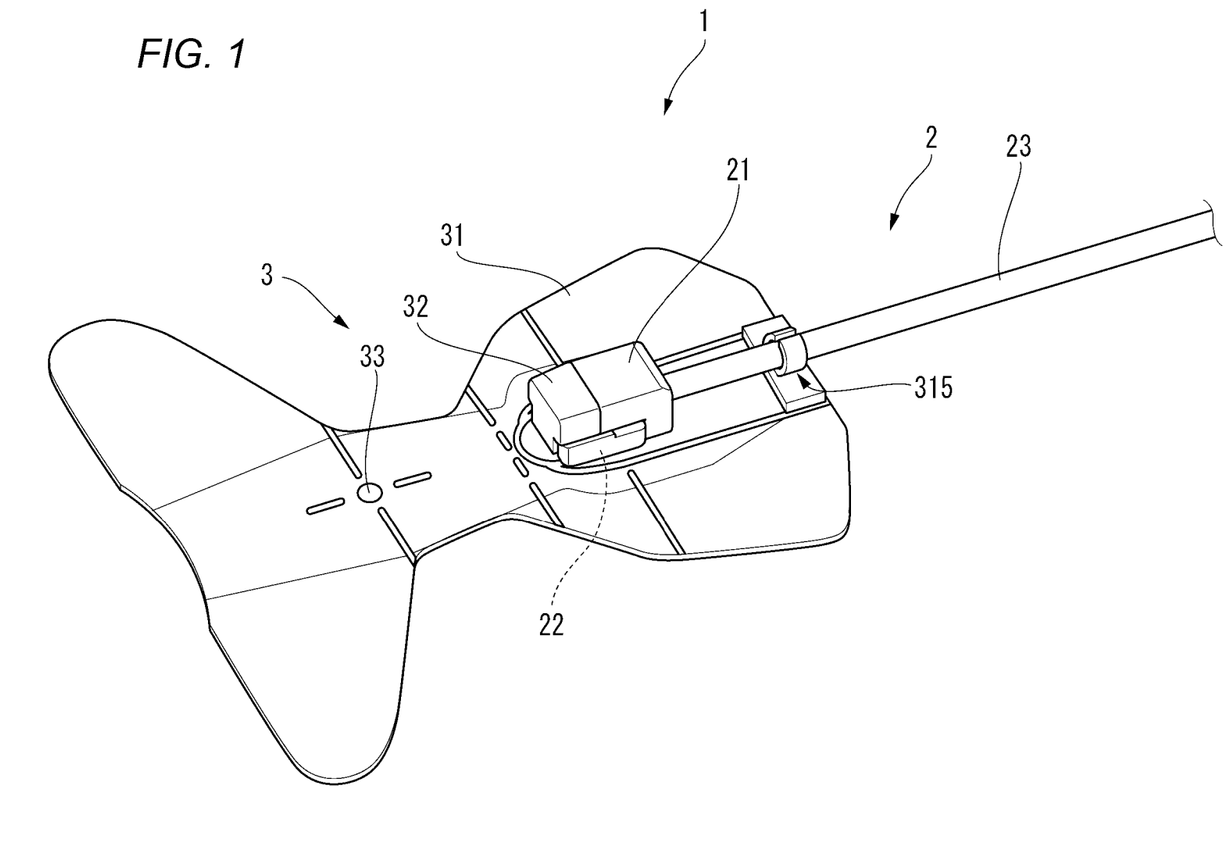
FIG. 1 illustrates an appearance of a sensor according to an embodiment.

FIG. 1 illustrates an appearance of a sensor 1 according to an embodiment. The sensor 1 is adapted to be attached to a fingertip of a subject to calculate a blood light absorber concentration. The sensor 1 is an example of a medical sensor. The fingertip is an example of a subject's body. Examples of the blood light absorber concentration include a transcutaneous arterial oxygen saturation (SpO2), carboxyhemoglobin and methemoglobin.

The sensor 1 comprises a reusable portion 2 and a disposable portion 3. The reusable portion 2 is configured to be reused at least once. The disposable portion 3 is configured to be discarded or recycled after a single use.

The reusable portion 2 comprises a first connector 21. That is, the first connector 21 can be reused at least once. The first connector 21 is an example of a reusable connector.

Figure 2A:
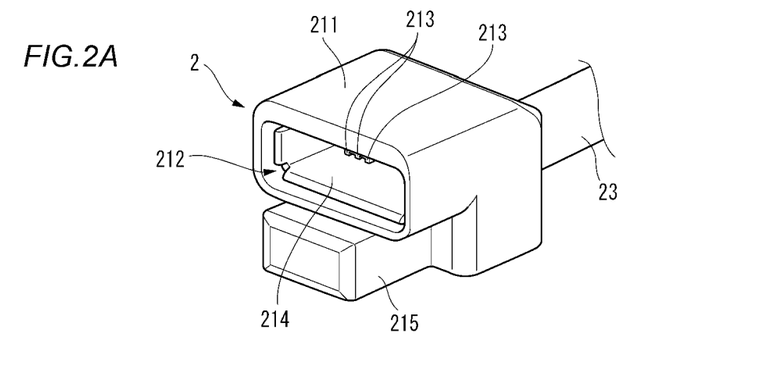
FIG. 2A illustrates an appearance of a reusable portion of the sensor.
Figure 2B:
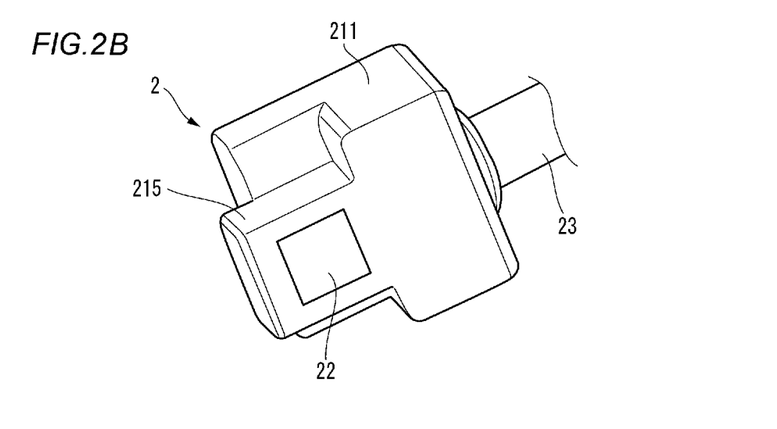
FIG. 2B illustrates an appearance of the reusable portion.
Figure 2C:
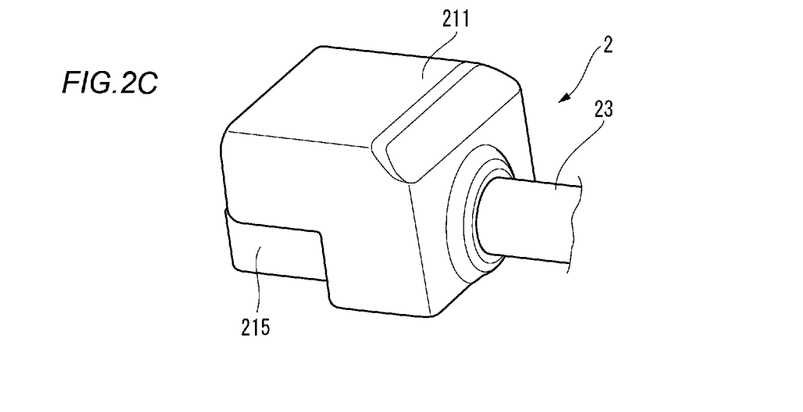
FIG. 2C illustrates an appearance of the reusable portion.

FIG. 2A illustrates an appearance of the first connector 21 as viewed from an upper front side. FIG. 2B illustrates an appearance of the first connector 21 as viewed from a lower front side. FIG. 2C illustrates an appearance of the first connector 21 as viewed from an upper rear side.

The first connector 21 comprises a female housing 211. The female housing 211 is an example of a female portion. The female housing 211 defines an accommodation space 212. A plurality of male terminals 213 are disposed in the accommodation space 212.

The reusable portion 2 comprises a light emitting portion 22. The light emitting portion 22 emits light. In the present embodiment, the light emitting portion 22 is supported by the female housing 211.

The light emitting portion 22 includes a plurality of light emitting elements (not illustrated). The plurality of light emitting elements are accommodated in the female housing 211. Each of the light emitting elements is a semiconductor light emitting element that emits light including a predetermined wavelength. Examples of the semiconductor light emitting element include a light emitting diode and a laser diode. The number of light emitting elements and the value of the wavelength are appropriately determined in accordance with the type of the blood light absorber concentration to be obtained.

The reusable portion 2 comprises a cable 23. The reusable portion 2 is connected to a pulse photometer (not illustrated) with the cable 23. The cable 23 accommodates a power supply line and a control signal line. The power supply line and the control signal line are connected to a driving circuit (not illustrated) housed in the female housing 211. The power supply line supplies power from the pulse photometer to the driving circuit. The control signal line supplies a control signal transmitted from the pulse photometer to the driving circuit for controlling turning the on/off operation of each light emitting element.

Figure 3A:
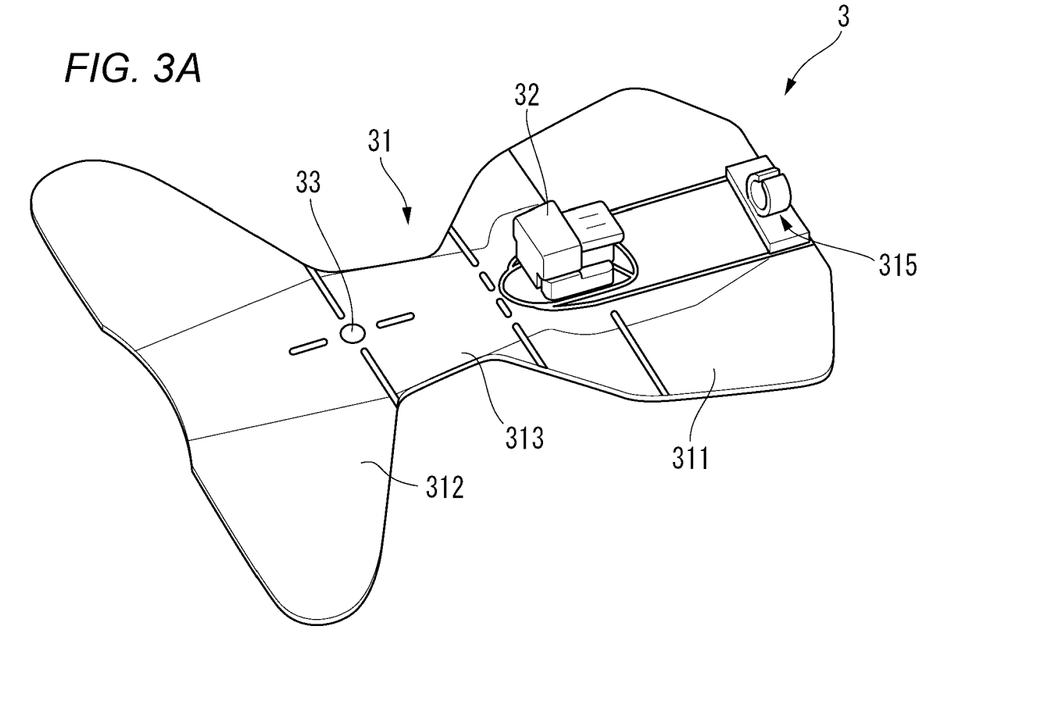
FIG. 3A illustrates an appearance of a disposable portion of the sensor.

As illustrated in FIG. 3A, the disposable portion 3 comprises a support 31. The support 31 is a portion adapted to be attached to a fingertip of the subject. The way of attachment will be described later.

The disposable portion 3 comprises a second connector 32. The second connector 32 is discarded or recycled after a single use. The second connector 32 is an example of a disposable connector.

Figure 3B:
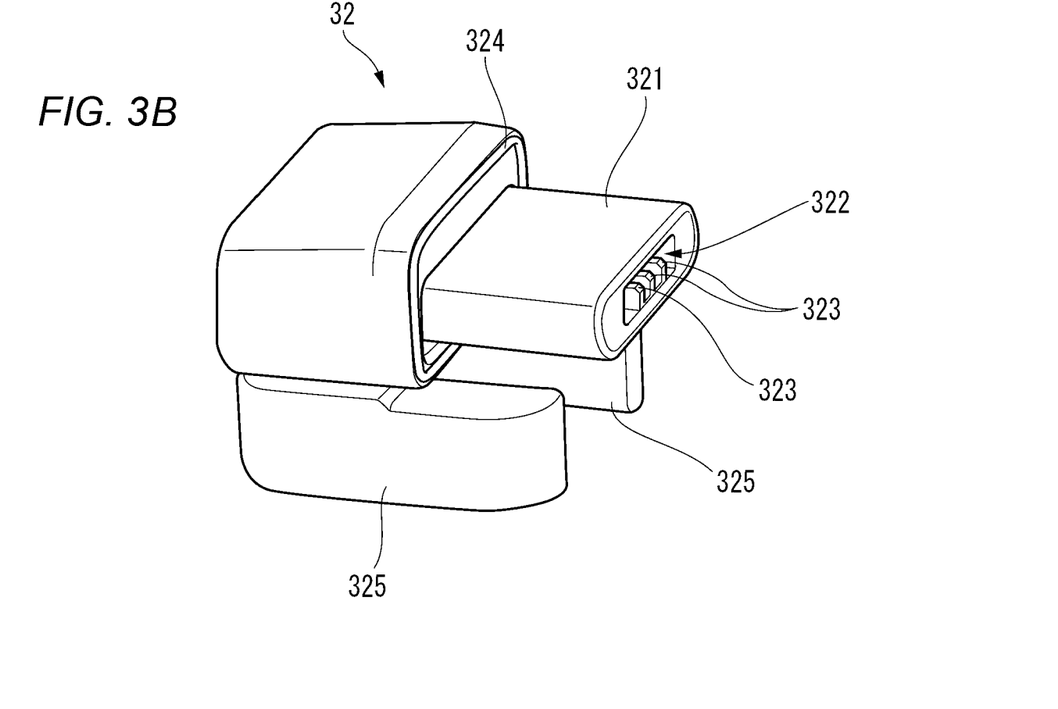
FIG. 3B illustrates an appearance of the disposable portion.

As illustrated in FIG. 3B, the second connector 32 comprises a male housing 321. The male housing 321 is an example of a male portion. The male housing 321 defines an accommodation space 322. A plurality of female terminals 323 are disposed in the accommodation space 322.

As illustrated in FIG. 3A, the disposable portion 3 comprises a light detecting portion 33. The light detecting portion 33 comprises a light detecting element having a light detecting surface. The light detecting element outputs a light detecting signal corresponding to the amount of light detected on the light detecting surface. Examples of the light detecting element include a photodiode, a phototransistor, and a photoresistor. The light detecting portion 33 is supported by the support 31. The light detecting surface of the light detecting element is exposed on a back surface of the support 31.

The support 31 comprises a first portion 311, a second portion 312 and a third portion 313. The second connector 32 is supported by the first portion 311. The light detecting portion 33 is supported by the second portion 312. The third portion 313 connects the first portion 311 and the second portion 312 together.

The light detecting element is electrically connected to the female terminals 323 via a power supply line and a light detecting signal line. The power supply line and the light detecting signal line are supported by the support 31 so as to extend within the third portion 313.

Figure 4A:
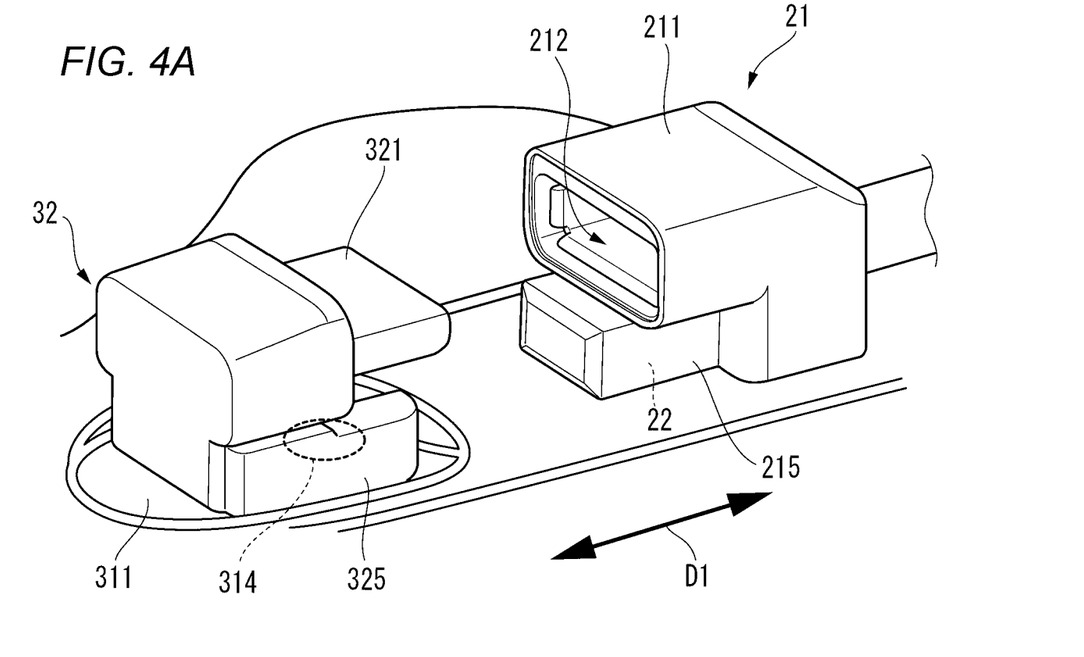
FIG. 4A illustrates how to couple the reusable portion and the disposable portion.

As illustrated in FIG. 4A, the support 31 has a translucent portion 314. The translucent portion 314 is formed of a material having transparency with respect to the wavelength of light emitted from the light emitting portion 22. The translucent portion 314 is located in the vicinity of the second connector 32 in the first portion 311.

The first connector 21 of the reusable portion 2 and the second connector 32 of the disposable portion 3 can be coupled to each other. The male housing 321 of the second connector 32 is fitted into the accommodation space 212 of the first connector 21, whereby the coupling is performed. At this time, the male terminals 213 of the first connector 21 and the female terminals 323 of the second connector 32 are electrically connected to each other.

The power supply line accommodated in the cable 23 is also connected to one of the male terminals 213 of the first connector 21. Therefore, the electric power from the pulse photometer is also supplied to the light detecting element of the light detecting portion 33 via one of the female terminals 323 and the power supply line supported by the support 31. That is, by coupling the first connector 21 and the second connector 32, also the light detecting element can be driven.

Figure 4B:
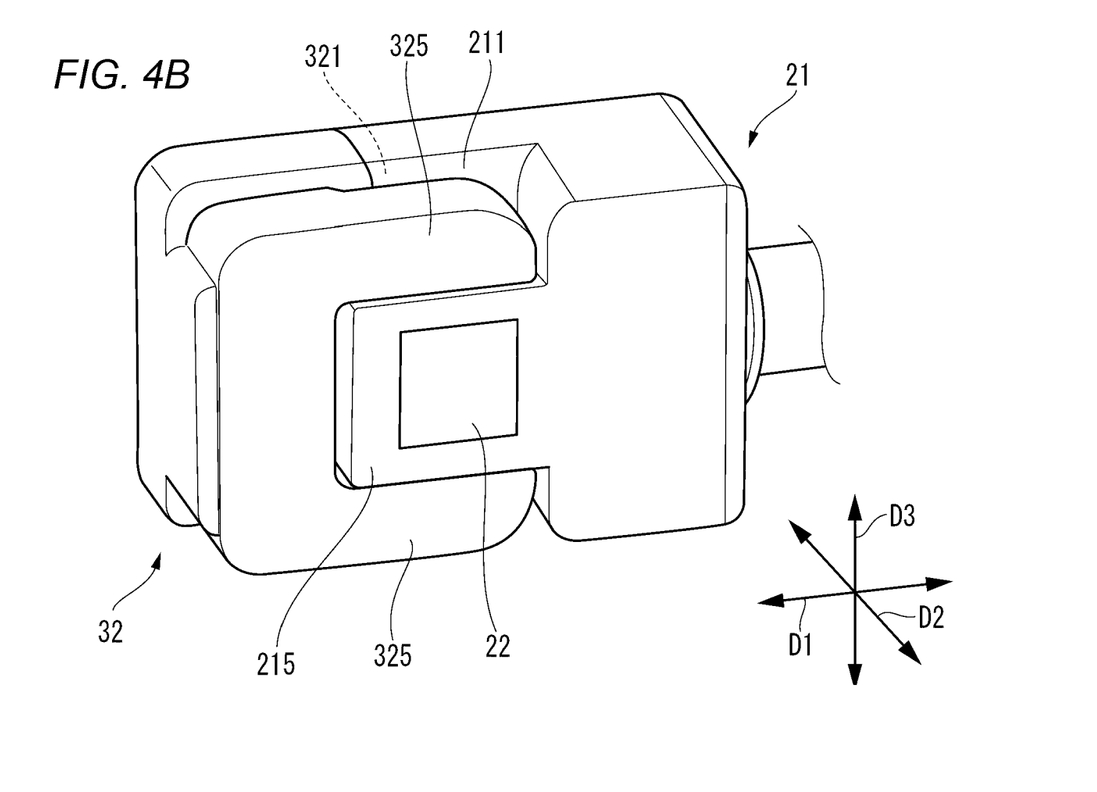
FIG. 4B illustrates how to couple the reusable portion and the disposable portion.

FIG. 4B illustrates the first connector 21 and the second connector 32 in the coupled state. At this time, the light emitting portion 22 is disposed so as to face the translucent portion 314 of the support 31. As a result, the sensor 1 in the state illustrated in FIG. 1 is obtained.

The sensor 1 is attached to the fingertip of the subject in the following manner. First, the first portion 311 of the support 31 is placed on one of the nail side and the ball of the finger. The back surface of the first portion 311 has adhesiveness. Subsequently, the support 31 is bent while the third portion 313 is opposed to the tip of the finger, whereby the second portion 312 is disposed on the other of the nail side and the ball of the finger. The back surface of the second portion 312 has adhesiveness. Thereafter, a pair of wing portions formed on both lateral sides of the first portion 311 and a pair of wing portions formed on both lateral sides of the second portion 312 are wrapped around both lateral sides of the finger, thereby completing the fixing of the sensor 1 to the fingertip.

As a result, the light emitting portion 22 faces one of the nail side and the ball of the finger. On the other hand, the light detecting portion 33 faces the other of the nail side and the ball of the finger. The light emitted from the light emitting portion 22 passes through the translucent portion 314 of the support 31 and enters the tissue of the fingertip of the subject. The light having passed through the tissue is detected by the light detecting surface of the light detecting portion 33. The light detecting signal outputted from the light detecting element of the light detecting portion 33 is transmitted to one of the female terminals 323 of the second connector 32 via the light detecting signal line.

The cable 23 also accommodates a light detecting signal line. The light detecting signal line electrically connects one of the male terminals 213 of the first connector 21 and the pulse photometer. Therefore, the light detecting signal transmitted to one of the female terminals 323 of the second connector 32 is relayed to the pulse photometer through the associated one of the male terminals 213 and the cable 23. The detected light signal is subjected to appropriate processing in the pulse photometer.

In the next use, the reusable portion 2 is reused and a new disposable portion 3 is prepared. The reused first connector 21 and the new second connector 32 are coupled to obtain a new sensor 1.

As described above, the sensor 1 according to the present embodiment can be divided into the reusable portion 2 having the light emitting portion 22 and the disposable portion 3 having the light detecting portion 33. Since the light emitting element having a relatively high unit price can be reused, the running cost of the sensor 1 can be reduced. This advantageous effect becomes more remarkable as the number of light emitting elements used by the sensor 1 increases.

On the other hand, the light emitting portion 22 is disposed so as to face the translucent portion 314 only by coupling the first connector 21 and the second connector 32. Since the light detecting portion 33 is fixed to the support 31 in advance as a part of the disposable portion 3, the operation of positioning the light detecting portion 33 on the support 31 is omitted, so that the time until the sensor 1 is made usable can be shortened.

Therefore, it is possible to enhance the convenience of the sensor 1 comprising the reusable portion 2 and the disposable portion 3.

Figure 5:
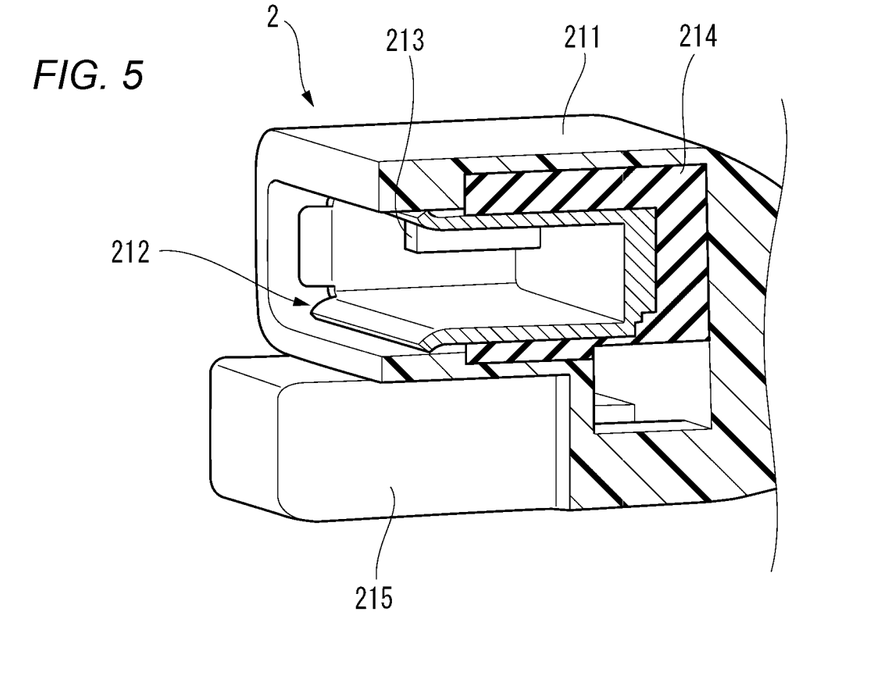
FIG. 5 illustrates a cross section of a part of the reusable portion of the sensor.

As illustrated in FIG. 5, a sealing member 214 may be disposed in the accommodation space 212 defined by the female housing 211 of the first connector 21. The sealing member 214 prevents moisture from entering the interior of the female housing 211 through the accommodation space 212. The sealing member 214 is an example of a waterproof structure. In this example, the sealing member 214 is a rubber packing. As the sealing member 214, an O-ring, a gasket, a resin mold, or the like can be appropriately employed.

In the clinical environment, blood, body fluid, disinfecting fluid, infusion fluid, and the like may adhere to the sensor 1 during use. According to the above-described configuration, electrical components such as the light emitting portion 22 can be protected from such liquid. After the sensor 1 is used, the disposable portion 3 can be separated and the reusable portion 2 can be subjected to flushing or immersion disinfection. As a result, it is possible to reduce the load of the cleaning/disinfecting work performed by the medical workers for reusing the reusable portion 2. Therefore, the convenience of the sensor 1 comprising the reusable portion 2 and the disposable portion 3 can be further enhanced.

As illustrated in FIG. 3B, the second connector 32 may include a sealing member 324. The sealing member 324 is disposed so as to be located between the first connector 21 and the second connector 32 that are in the coupled state. As the sealing member 324, a gasket such as an O-ring having elasticity can be exemplified.

According to such a configuration, when the sensor 1 in which the first connector 21 and the second connector 32 are coupled is used, it is possible to prevent liquid such as blood, body fluid, disinfecting fluid, and infusion fluid from entering the second connector 32. As a result, electrical components including the light detecting portion 33 can be protected from such liquid. Therefore, the convenience of the sensor 1 comprising the reusable portion 2 and the disposable portion 3 can be further enhanced.

In the present embodiment, the first connector 21 comprises the female housing 211, and the second connector 32 comprises the male housing 321. However, it is also possible to adopt a configuration in which the second connector 32 comprises a female housing, and the first connector 21 comprises a male housing accommodated in the female housing. In any of these cases, as illustrated in FIG. 4B, at least a part of the light emitting portion 22 may be disposed at a position overlapping with the female housing when the first connector 21 and the second connector 32 are coupled to each other, as viewed from a vertical direction D2 intersecting with a coupling direction D1.

According to such a configuration, it is possible to arrange the light emitting portion 22 by efficiently utilizing a space formed for coupling the first connector 21 and the second connector 32. As a result, it is possible to suppress the increase in size of the sensor 1, so that it is possible to reduce the burden on the subject when the attachment of the sensor 1 is performed. Therefore, the convenience of the sensor 1 comprising the reusable portion 2 and the disposable portion 3 can be further enhanced.

In order to realize such an arrangement of the light emitting portion 22, as illustrated in FIG. 4A, the first connector 21 is provided with a protrusion 215 extending below the female housing 211 along the coupling direction D1. The light emitting portion 22 is supported by the protrusion 215.

As illustrated in FIG. 3B, the second connectors 32 are provided with a pair of protrusions 325. As illustrated in FIG. 4B, the pair of protrusions 325 clamps the protrusion 215 from the left-right direction D3 when the first connector 21 and the second connector 32 are coupled to each other. As a result, the pair of protrusions 325 restrains the displacement of the light emitting portion 22 in the left-right direction D3 intersecting with the coupling direction D1. The pair of protrusions 325 is an example of a restraining member. The number of the protrusions 325 may be one or three or more as long as such displacement can be restrained.

According to such a configuration, when the sensor 1 in which the first connector 21 and the second connector 32 are coupled is used, the light emitting unit 22 can be prevented from deviating from a predetermined position, i.e., the position facing the translucent portion 314. As a result, it is possible to suppress a decrease in the measurement accuracy of the blood light absorber concentration by the sensor 1. Therefore, the convenience of the sensor 1 comprising the reusable portion 2 and the disposable portion 3 can be further enhanced.

As illustrated in FIGS. 1 and 3A, the support 31 may include a retaining member 315. The retaining member 315 retains the cable 23 connected to the first connector 21 having coupled to the second connector 32. The retaining member 315 may be realized by a pair of arc-shaped protrusions as illustrated in the example, may be realized by a single hook having a C-shaped cross-sectional shape when viewed from the direction in which the cable 23 extends, or may be realized by a belt having a hook-and-loop fastener capable of coupling with the surface of the support 31.

According to such a configuration, the relative displacement between the support 31 and the cable 23 can be suppressed. As a result, the annoyance associated with the displacement of the cable 23 during the use of the sensor 1 can be reduced. Therefore, the convenience of the sensor 1 comprising the reusable portion 2 and the disposable portion 3 can be further enhanced.

The above embodiments are illustrative only to facilitate an understanding of the presently disclosed subject matter. The configuration according to the above embodiment can be appropriately modified or improved without departing from the spirit of the presently disclosed subject matter.

Figure 6:
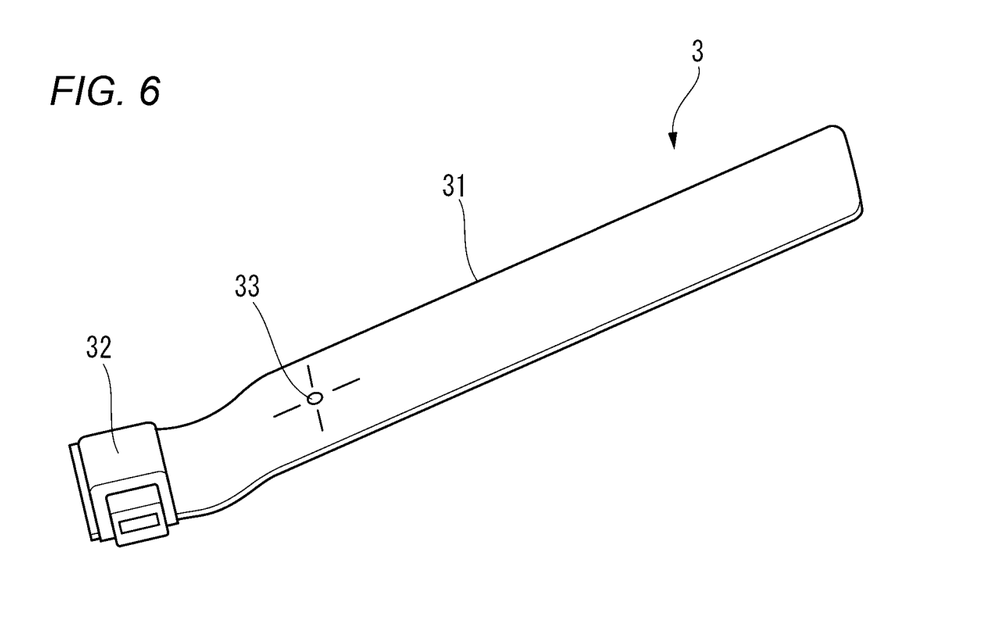
FIG. 6 illustrates an appearance of another example of the disposable portion.

The shape of the support 31 of the disposable portion 3 may be appropriately determined depending on the application. For example, as another example illustrated in FIG. 6, the support 31 may have a belt shape in which the second connector 32 is supported at one end. In this example, fixation is performed by wrapping the support 31 around the body of the subject.

The application of the medical sensor to which the spirit of the presently disclosed subject matter may be applied is not limited to the detection of the blood light absorber concentration. In the case of a medical sensor that optically detects a physiological parameter, the spirit of the presently disclosed subject matter can be applied through an appropriate shape change.

The present application is based on Japanese Patent Application No. 2019-049555 filed on Mar. 18, 2019, the entire contents of which are hereby incorporated by reference.

The invention claimed is:

1. A medical sensor comprising:
a reusable portion comprising:
a light emitter configured to emit light; and
a first connector; and
a disposable portion comprising:
a support having a translucent portion and adapted to be attached to a body of a subject;
a light detector supported by the support and configured to output a signal corresponding to an amount of incident light received from the light emitter; and
a second connector supported by the support and configured to couple with the first connector,
wherein when the first connector and the second connector are coupled, the light emitter is disposed so as to face the translucent portion in a first direction, and the first connector is enabled to receive the signal output by the light detector via the second connector;
wherein one of the first connector and the second connector has a male portion;
wherein the other of the first connector and the second connector has a female portion configured to accommodate the male portion under the condition that the first connector and the second connector are coupled;
wherein the light emitter is arranged to be located outside the female portion; and
wherein an accommodation of the male portion by the female portion is done at a position overlapping the light emitter when viewed from the first direction.

2. The medical sensor according to claim 1,
wherein the first connector comprises a waterproof structure at least for the light emitter.

3. The medical sensor according to claim 2,
wherein the second connector comprises a sealing member configured to be located between the first connector and the second connector under the condition that the first connector and the second connector are coupled.

4. The medical sensor according to claim 1,
wherein the first connector has a protrusion extending in the coupling direction and supporting the light emitter.

5. The medical sensor according to claim 1,
wherein the disposable portion has a restraining member configured to restrain displacement of the light emitter in the direction intersecting with the coupling direction under the condition that the first connector and the second connector are coupled.

6. The medical sensor according to claim 1,
wherein the reusable portion comprises a cable electrically connected to the first connector; and
wherein the support comprises a retaining member configured to retain the cable on the support under the condition that the first connector and the second connector are coupled.

7. A reusable portion of a medical sensor comprising:
a light emitter configured to emit light; and
a reusable connector,
wherein the reusable connector is configured to be coupled with a disposable connector that is a part of a disposable portion of the medical sensor;
wherein when the reusable connector and the disposable connector are coupled, the light emitter is disposed so as to face a translucent portion supported by a support that is a part of the disposable portion adapted to be attached to a body of a subject in a first direction;
wherein when the reusable connector and the disposable connector are coupled, the reusable connector is enabled to receive, via the disposable connector, a signal outputted from a light detector portion of the disposable portion, the signal corresponding to an amount of light received from the light emitter that is incident on the light detector portion;

wherein one of the reusable connector and the disposable connector has a male portion;

wherein the other of the reusable connector and the disposable connector has a female portion configured to accommodate the male portion under the condition that the reusable connector and the disposable connector are coupled;

wherein the light emitter is arranged to be located outside the female portion; and wherein an accommodation of the male portion by the female portion is done at a position overlapping the light emitter when viewed from the first direction.

8. The reusable portion of the medical sensor according to claim 7,
wherein the reusable connector comprises a waterproof structure at least for the light emitter.

9. The reusable portion of the medical sensor according to claim 7,
wherein one of the reusable connector and the disposable connector has a male portion;
wherein the other of the reusable connector and the disposable connector has a female portion configured to accommodate the male portion under the condition that the reusable connector and the disposable connector are coupled; and
wherein when the reusable connector and the disposable connector are coupled, at least a part of the light emitter is disposed at a position overlapping with the female portion as viewed from a direction intersecting with a coupling direction of the reusable connector and the disposable connector.

10. The reusable portion of the medical sensor according to claim 9,
wherein the reusable connector has a protrusion extending in the coupling direction and supporting the light emitter.

11. A disposable portion of a medical sensor comprising:
a support having a translucent portion and adapted to be attached to a body of a subject;
a light detector supported by the support and configured to output a signal corresponding to an amount of incident light received from a light emitter; and
a disposable connector supported by the support and configured to couple with a reusable connector that is a part of a reusable portion of the medical sensor, wherein when the reusable connector and the disposable connector are coupled, the translucent portion is disposed so as to face the light emitter that is a part of the reusable portion configured to emit light in a first direction;

wherein the disposable connector is configured to relay the signal to the reusable connector under the condition that the reusable connector and the disposable connector are coupled to the reusable connector;

wherein one of the reusable connector and the disposable connector has a male portion;

wherein the other of the reusable connector and the disposable connector has a female portion configured to accommodate the male portion under the condition that the reusable connector and the disposable connector are coupled;

wherein the light emitter is arranged to be located outside the female portion; and wherein an accommodation of the male portion by the female portion is done at a position overlapping the light emitter when viewed from the first direction.

12. The disposable portion of the medical sensor according to claim 11,
wherein the disposable connector comprises a sealing member configured to be located between the reusable connector and the disposable connector when the reusable connector and the disposable connector are coupled.

13. The disposable portion of the medical sensor according to claim 11, further comprising:
a restraining member configured to restrain displacement of the light emitter in the direction intersecting with the coupling direction when the reusable connector and the disposable connector are coupled.

14. The disposable portion of the medical sensor according to claim 11,
wherein the support comprises a retaining member configured to retain a cable, that is a part of the reusable portion electrically connected to the reusable connector, on the support under the condition that the reusable connector and the disposable connector are coupled.

* * * * *